Patented Oct. 10, 1944

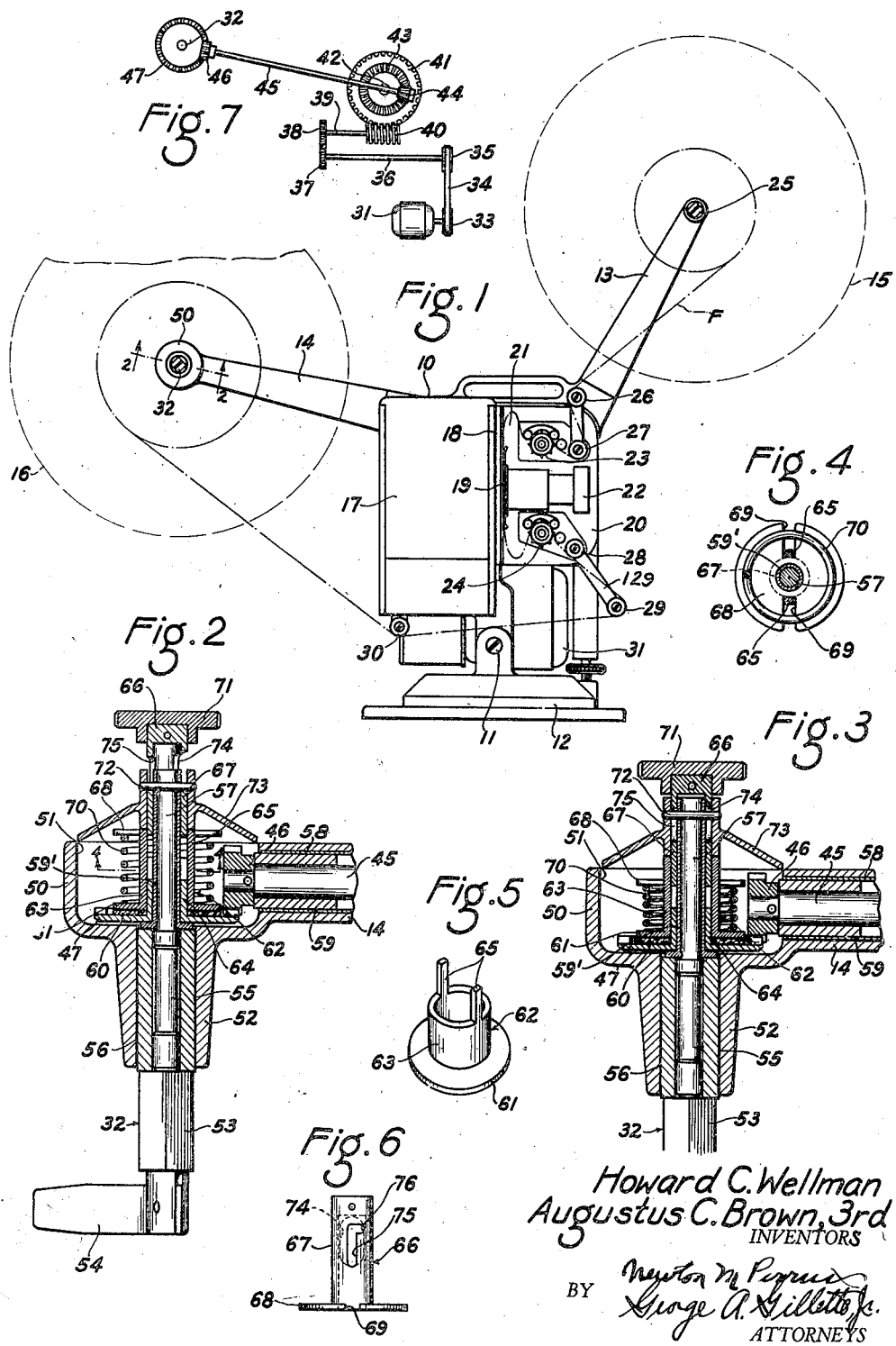

2,360,294

UNITED STATES PATENT OFFICE 2,360,294

REEL DRIVE MECHANISM FOR MOTION PICTURE PROJECTORS

Howard C. Wellman, Rochester, and Augustus C. Brown, 3rd, Buffalo, N. Y., assignors to Eastman Kodak Company, Rochester, N. Y., a corporation of New Jersey Application October 30, 1942, Serial No. 463,902

6 Claims. (Cl. 242—55)

This invention relates to motion picture apparatus and more particularly to the reel drive mechanism of motion picture projectors.

The primary object of the invention is to provide a film reel drive mechanism in which the frictional engagement between the driving means and the driven means may be varied depending on whether the film is being projected or rewound.

Another object is to provide a mechanism in which the frictional engagement between the driving means and the driven means will be increased for rewinding and thereby provide a faster and more positive drive.

And yet another object is to provide a mechanism in which the increased frictional engagement between the driving means and the driven means will automatically be returned to a normal frictional engagement when the direction of the drive is reversed.

A further object is to provide a mechanism in which a selector member is movable to one position for increasing the frictional engagement of the driving means and the driven means for rewinding and automatically returned to its other position when the direction of the drive is reversed for projecting.

Other and further objects will be suggested to those skilled in the art by the description which follows.

The above and other objects are embodied in a motion picture apparatus having a support, a spindle rotatably mounted in the support, a drive mechanism which is adapted to be rotated in opposite directions, a driven means in frictional engagement with the drive mechanism, a selector member connected to the driven means for driving the spindle and movable into either of two positions for increasing in one of said positions the frictional engagement of the driven means and the drive mechanism, and releasable means between the driven means and the spindle for holding the selector member in the one position when the drive mechanism is being used for rewinding and automatically released by rotation of the drive mechanism in the opposite direction for projecting to permit movement of the selector member to its other position.

Reference is hereby made to the accompanying drawing in which like reference characters designate similar parts and wherein:

Fig. 1 is a side elevation of a projector utilizing the present invention;

Fig. 2 is an enlarged section, taken on the line 2—2 of Fig. 1, and showing the arrangement of the various parts when the drive is operated for projecting with the selector member in one position;

Fig. 3 is a view similar to Fig. 2 but shows the arrangement of the various parts when the drive is reversed for rewinding with the selector member moved to its other position for increasing the frictional engagement between the driving means and the driven means;

Fig. 4 is a partial sectional view, taken substantially on the line 4—4 of Fig. 2;

Fig. 5 is a detail view of the driven means;

Fig. 6 is a detail plan view of the selector member for connecting the driven means with the spindle; and Fig. 7 is a diagrammatic view of the mechanism for driving the spindle.

It is well known that when film is moved past the film gate of a projector to the take-up reel, an arrangement is necessary whereby the spindle for supporting and driving the take-up reel can slip when the film tension becomes too great in order to prevent breaking of the film. When the film is rewound, by interchanging the supply and take-up reels, it is essential that the convolutions of film be wound very tightly with no gaps between the convolutions. When small size reels are used, the friction connection between the spindle and the driving mechanism is usually sufficient to obtain a tightly wound reel. However, when reels of very large size are used, i. e., 800 or 1600 foot reels, the friction between the spindle and the driving mechanism is not great enough to obtain a tightly wound reel because the drive is not positive enough to draw the film from the take-up reel with a steady and uniform pull. To eliminate these difficulties, we have provided means whereby the frictional engagement between the driving mechanism and the driven means connected to the spindle may be increased during rewinding of the film. By increasing the frictional engagement of these members, the drive is more nearly a positive drive thereby permitting the film to be rewound much faster.

In the illustrated embodiment of the invention, as shown in Fig. 1, the motion picture apparatus comprises a casing 10 mounted and pivoted at 11 to the base 12 and having two supporting arms 13 and 14 for the supply reel 15 and the take-up reel 16, respectively. The casing 10 comprises a lamp house 17 having a front wall 18 upon which the film gate 19 is mounted, and a mechanism chamber 20 having a side wall 21 for supporting the objective 22 and the sprockets 23 and 24 for moving the film F past the gate 19.

The supply reel 15 is mounted on a shaft 25 which is idly mounted on the end of the arm 13. The film F passes over the guide roll 26, around the guide roll 27, over the sprocket 23, through the film gate 19, over the sprocket 24, past a guide roller 28, around a guide roller 29 on arm 129, under the guide roll 30 mounted on the bottom of the lamphouse 17, and thence to the take-up reel 16. The sprockets 23 and 24 are driven by the reversible motor 31 mounted on the casing 10 through a suitable gear train, as is well known.

The spindle member or shaft for supporting and driving the take-up reel 16, broadly designated by the numeral 32, is driven by the reversible motor 31 through a gear train as shown in Fig. 7. The motor 31 is provided with a pulley 33 which is connected by the belt 34 to the pulley 35 on the shaft 36. The shaft 36 carries a gear 37 which meshes with the gear 38 on the shaft 39 for turning the worm 40. The worm 40 drives the worm gear 41 on the shaft 42 which carries the bevel gear 43 which meshes with the bevel pinion 44 on the shaft 45. The shaft 45 extends through the hollow supporting arm 14 and carries a pinion 46 for driving the crown gear 47, as shown more clearly in Figs. 2 and 3.

Referring now to Figs. 2 and 3, the hollow arm 14 is provided with a housing 50 having an opening 51 and an extension 52 to provide a bearing for the shaft 32. The shaft 32 has an external square portion 53 for supporting the take-up reel 16 which is held in place by the pivoted arm 54, as is well known. The intermediate portion 55 of the shaft 32 is mounted in a bearing sleeve 56 in the extension 52, and the reduced end portion 57 has mounted thereon the mechanism for driving said shaft. The hollow arm 14 is provided with a liner 58 and a bearing sleeve 59 in the end of said arm for the shaft 45 which carries the pinion 46 herebefore described.

The drive member or crown gear 47 is loosely mounted on the bearing sleeve 59' surrounding the portion 57 of the spindle member 32 for rotation in opposite directions. A cork or fibre disc 60 is located between the internal face of the crown gear 47 and the flange 61 of the driven means 62. The driven means 62 comprises the flange 61 and a sleeve portion 63 mounted on the bearing portion 64 of the crown gear 47 and has two axially extending lugs 65, as shown in Fig. 5, for the purpose to be described hereinafter.

The selector member 66 comprises a sleeve 67 having a flange 68 which is provided with two radial slots 69 for engaging the lugs 65, as shown in Figs. 4 and 6. The sleeve 67 is mounted on the bearing sleeve 59' and movable axially therealong. The outside diameter of the sleeve 67 is such that when it is moved along the bearing sleeve 59', it will permit the lugs 65 to pass thereover. A coil spring 70 surrounds the sleeve portion 63 and is held between the flanges 61 and 68 for the purpose to be described hereinafter. A knob 71 is fixed to the end of the sleeve 67 for moving the sleeve axially.

The releasable means between the selector member 66 and the spindle member 32 comprises a pin 72 which is fixed in the end portion 57 of the spindle member 32 for holding a cover 73 in position over the opening 51 and for guiding the sleeve 67 therebetween during axial movement. The pin 72 passes through two slots, a large axial slot 74 and an inverted L-shaped slot 75 having a radial extension 76 as clearly shown in Fig. 6.

The operation of the various elements will now be described. During the projecting of the film F, the spindle member 32 and the film reel 16 is driven by the motor 31 through the gear train described above in a clockwise direction, and the film reel 15 is also rotated in a clockwise direction as the film F is withdrawn for movement through the gate 19. The rotation of the spindle member 32 is obtained in the following manner. The driven means 62 is held in position by the inner end of the bearing for the cover 73 abutting the end of the lugs 65, the cover 73 being held in position by the pin 72 carried by the end portion 57 of the spindle member 32. The outward position of the selector member 66 is limited by the ends of the slots 74 and 75, as shown in Fig. 2, the flange 68 thereby holding the spring 70 under compression so that the disc 60 is compressed between the flange 61 and the internal face of the crown gear 47 so as to provide a frictional driving connection between the sleeve 63 and the crown gear 47. The sleeve 63 drives the sleeve 67 through the engagement of the lugs 65 with the slots 69. As the sleeve 67 rotates, the slot 75 also rotates and drives the pin 72 which passes through the slot 75 and which is fixed to the spindle member 32.

After the film has been projected, the reels 15 and 16 are interchanged with respect to their projecting positions so as to rewind the film F. In order to provide a more positive drive than is used for projecting, in order to rewind faster, and to prevent the convolutions of film from gapping, the selector member 66 is moved inwardly on the bearing sleeve 59' by means of the knob 71 until the other end of the slot 75 abuts the pin 72, as shown in Fig. 3. The knob 7 is then rotated until the pin 72 abuts against the end of the radial extension 76 of the slot 75 to lock the selector means in its rewind position. As the knob 71 is moved axially, the sleeve 67 and the flange 68 are also moved axially with the slots 69 and the lugs 65 always in engagement, and the flange 68 compressing the spring 70 to increase the frictional engagement between the crown gear 47 and driven means 62. The tendency of the spring 70 to expand also helps in locking the selector member in position by keeping the edge of the radial extension 76 against the pin 72. The spindle member 32 is rotated in exactly the same manner as described above, except that since the direction of rotation is reversed for rewinding by the motor 31, the pin 72 will be driven by the radial extension 76 instead of by the slot 75 as is the case when projecting.

The selector member 66 can be returned either manually or automatically to its position for projecting. To return it manually, the knob 71 is rotated until the pin 72 is in alignment with the slot 75 and then the spring 70 will automatically return it to its original position, as shown in Fig. 2. If the operator should forget to reset the selector member 66 after rewinding, then when the projector is started, the frictional engagement between the crown gear 47 and the flange 61 will be so great that the sleeve 67 will be rotated until the slot 75 aligns itself with the pin 72 and at that point the spring 70 will return the selector member to its original position.

It is obvious that other mechanical arrangements may be used or provided and the motion picture apparatus disclosed herein is merely illustrative.

Having now particularly described our invention, what we desire to secure by Letters Patent of the United States and what we claim is:

1. In a motion picture apparatus, a selective drive mechanism for a film reel comprising a support, a spindle member rotatably mounted in said support and for supporting said film reel, a drive member rotatable in opposite directions on said spindle member, a driven means including a sleeve in frictional engagement with said drive member, a selector member movable to two positions and connected to said sleeve for increasing in one of said positions the frictional engagement of said sleeve with said drive member, and a releasable means between said selector member and said spindle member for holding the former in said one position during rotation of said drive member in one direction and automatically released by rotation of said drive member in the other direction to permit movement of said selector member to its other position.

2. In a motion picture apparatus, a selective drive mechanism for a film reel comprising a support, a spindle member rotatably mounted in said support and for supporting said film reel, a drive member rotatable in opposite directions on said spindle member, a driven means including a sleeve in frictional engagement with said drive member and provided with axially extending lugs, a selector member connected to said spindle member and having a flange provided with radial slots adapted to engage said lugs for rotating said spindle member and movable on said spindle member into either of two positions with respect to said sleeve for increasing in one of said positions the frictional engagement of said sleeve with said drive member, and a releasable means between said selector member and said spindle member for holding the former in said one position during rotation of said drive member in one direction and automatically released by rotation of said drive member in the other direction to permit movement of said selector member to its other position.

3. In a motion picture apparatus, a selective drive mechanism for a film reel comprising a support, a spindle member rotatably mounted in said support and for supporting said film reel, a drive member rotatable in opposite directions on said spindle member, a drive means including a sleeve having a flange and provided with axially extending lugs, a selector member movable on said spindle member and connected thereto and having a flange provided with radial slots for engaging said lugs for rotating said spindle member, said selector member being movable on said spindle member into either of two positions with respect to said sleeve, a resilient means between said flanges for maintaining said first mentioned flange in frictional engagement with said drive member in one position of said selector member and for increasing the frictional engagement of said first mentioned flange with said drive member when said selector member is in its other position, and a releasable means between said selector member and said spindle member for holding the former in said one position during rotation of said drive member in one direction and automatically released by rotation of said drive member in the other direction to permit movement of said selector member to its other position.

4. In a motion picture apparatus, a selective drive mechanism for a film reel comprising a support, a spindle member rotatably mounted in said support and for supporting said film reel, a drive member rotatable in opposite directions on said spindle member, a driven means including a sleeve in frictional engagement with said drive member, a selector member connected to said driven member and mounted on said spindle member for axial movement into either of two positions with respect to said sleeve for increasing in one of said positions the frictional engagement of said sleeve with said drive means and having a sleeve portion provided with axially extending slots, one of said slots having a radial extension, and a releasable means between said selector member and said spindle member including a pin carried by said spindle member and adapted to engage the slots in said sleeve portion for driving said spindle member and also adapted to engage the radial extension of one of said slots to hold said selector member in said one position during rotation of said drive member in one direction and adapted to be automatically released by rotation of said drive member in the other direction to permit movement of said selector member to its other position.

5. In a motion picture apparatus, a selective drive mechanism for a film reel comprising a support, a spindle member rotatably mounted in said support and for supporting said film reel, a drive member rotatable in opposite directions on said spindle member, a driven means including a sleeve in frictional engagement with said drive member and provided with axially extending lugs, a selector member having a flange provided with radial slots for engaging said lugs and a sleeve portion provided with axially extending slots, one of said slots having a radial extension, and mounted on said spindle member for axial movement into either of two positions with respect to said sleeve for increasing in one of said positions the frictional engagement of said sleeve with said drive means, and a releasable means between said selector member and said spindle member including a pin carried by said spindle member and adapted to engage the slots in said sleeve portion for driving said spindle member and also adapted to engage the radial extension of one of said slots to hold said selector member in said one position during rotation of said drive member in one direction and adapted to be automatically released by rotation of said drive member in the other direction to permit movement of said selector member to its other position.

6. In a motion picture apparatus, a selective drive mechanism for a film reel comprising a support, a spindle member rotatably mounted in said support and for supporting said film reel, a drive member rotatable in opposite directions on said spindle member, a driven means including a sleeve having a flange and provided with axially extending lugs, a selector member having a flange provided with axially extending slots, one of said slots having a radial extension, and mounted on said spindle member for axial movement into either of two positions, a helical resilient means encircling said sleeve between said flanges for maintaining said first mentioned flange in frictional engagement with said drive member in one position of said selector member and for increasing the frictional engagement of said flange with said drive member when said selector member is in its other position, and a releasable means between said selector member and said spindle member including a pin carried by said spindle member and adpted to engage the slots in said sleeve portion for driving said spindle member and also adapted to engage the radial extension of one of said slots to hold said selector member in said one position during rotation of said drive member in one direction and adapted to be automatically released by rotation of said drive member in the other direction to permit movement of said selector member to its other position.

HOWARD C. WELLMAN.
AUGUSTUS C. BROWN, 3RD.